United States Patent Office 3,527,649
Patented Sept. 8, 1970

3,527,649
CADMIUM SULFIDE OR CADMIUM SULFO-SELENIDE COLORED GLAZES AND PROCESS FOR PRODUCING SAME
Robert M. Sullivan, Washington, Pa., assignor to Hercules Incorporated, Wilmington, Del., a corporation of Delaware
No Drawing. Filed Dec. 6, 1967, Ser. No. 688,307
Int. Cl. C03c 5/02; C09c 1/10, 1/12
U.S. Cl. 106—48                                      8 Claims

ABSTRACT OF THE DISCLOSURE

Low to high temperature maturing glazes or enamels colored with cadmium sulfide yellow and/or cadmium sulfoselenide red pigments are described. The glazes are produced by smelting a sulfur- or sulfur and selenium-containing frit base under reducing conditions, mixing the smelted frit with a cadmium compound or a cadmium-containing frit and then firing the mixture to maturity.

This invention relates to the production of glazing compositions which provide brilliant yellow to bright red glazes on ceramic bodies and more particularly to the production of glazing compositions colored with cadmium sulfide yellow or cadmium sulfoselenide red pigment, and to the glazing compositions so produced and to their utilization as glazes for ceramic bodies.

It is known that cadmium sulfide yellow and/or cadmium sulfoselenide red pigments can be mixed with low melting frits or glasses, applied to ceramic or glass bodies and then fired at low temperatures to give colored glazes ranging from brilliant yellow through orange and red to deep maroon. However, because the cadmium sulfide or cadmium sulfoselenide pigments burn in air at temperatures above 800° F. (which temperatures are well below the normal maturation temperatures of many glazes), it is necessary with such pigments to use low melting frits and to employ firing temperatures below about 1750 to 1800° F. to avoid destruction of the color. Moreover, compositional constituents which favor the low softening temperatures of frits and good color with cadmium pigments also favor such undesirable properties as high thermal expansion and poor acid resistance. Thus, the specificity of frit constituents and operational conditions limit to a great extent the field of application.

It is also known to use the cadmium sulfide and cadmium sulfoselenide pigments to color glass. In the glass industry, the usual practice is to melt a glass composition which contains the cadmium and sulfur or cadmium, sulfur and selenium components of the pigment, form the melt into the desired article and then reheat at a temperature which is below the softening point of the glass but at which cadmium sulfide and cadmium sulfoselenide precipitate in the glass. Normal practice, however, requires the maintenance of essentially neutral conditions during the melting of the glass in order to minimize reduction of the cadmium ions to metallic cadmium which, because of its high vapor pressure, is subsequently lost at normal glass melting temperatures, and to minimize oxidation which results in loss of the sulfur or sulfur and selenium anions necessary for formation of the pigment. It has also been suggested to produce frits for cadmium sulfide or cadmium sulfoselenide colored glazes using this technique. The process, however, has never attained commercial importance, indicating that any advantages achieved by the technique are outweighed by the above disadvantage.

Now, in accordance with the present invention, it has been found that glazes having high maturation temperatures can also be colored yellow to red with cadmium sulfide and/or cadmium sulfoselenide pigments without destruction of the color, and that it is not necessary to maintain essentially neutral conditions during the smelting of the frit used in the glaze. More specifically, the present invention is directed to a process for producing glazing compositions contained finely dispersed cadmium sulfide yellow or cadmium sulfoselenide red pigment, which on firing to maturation temperatures on ceramic bodies, provide brilliant yellow to bright red glazes, the process comprising the steps of (a) adding to a glazing base the sulfur or sulfur and selenium components of the pigment; (b) heating the base in a reducing atmosphere to form a frit containing reduced sulfur or sulfur and selenium; and then (c) compounding the frit with a cadmium compound which produces cadmium ions at the maturation temperature. The invention is also directed to the glazing composition so produced, and to a process for using the compositions as a glaze for ceramic bodies.

In the process of the present invention, the sulfur or sulfur and selenium components are added to a glazing base or glass composition and the composition is smelted or reduced to vitrified form in a reducing atmosphere to form a frit. The glazing base or glass compositions will include in addition to silica, any of the ingredients known to provide good glazes on ceramic bodies, the number and amount of other ingredients being balanced to give desirable properties such as acid resistance, a particular coefficient of linear expansion or maturation temperature, etc. Ideally, cadmium compounds should not be present since under the conditions of smelting, the cadmium compound is reduced, at least in part, to elemental cadmium which is lost because of its high vapor pressure. The inclusion of cadmium at this point, however, is not harmful, but due to its high loss, is uneconomical and difficult to control. When color is important, it is usually desirable to avoid the inclusion of more than trace amounts of elements such as iron, copper, cobalt, and the like, which produce highly colored or dark compounds with sulfides. At concentrations of the order of up to about 0.1%, however, copper and iron are not harmful and may, in fact, be beneficial. The base compositions to which the sulfur or sulfur and selenium components are added are conventional frit formulations containing such constituents as silica, feldspar, calcium and/or magnesium carbonate, borax, boric acid, sodium carbonate, sodium nitrate, calcium fluoride, lead oxide, zinc oxide, and the like, and typically give frits containing (in terms of oxide content) the following:

| | Percent by weight |
|---|---|
| $SiO_2$ | 30–80 |
| $Li_2O$ | 0–5 |
| $K_2O$ | 0–12 |
| $Na_2O$ | 0–16 |
| $CaO$ | 0–20 |
| $MgO$ | 0–18 |
| $BaO$ | 0–45 |
| $SrO$ | 0–18 |
| $ZnO$ | 0–18 |
| $Al_2O_3$ | 0–20 |
| $B_2O_3$ | 0–30 |
| $ZrO_2$ | 0–4 |
| $PbO$ | 0–5 |

The sulfur and selenium components of the pigment can be added to the base composition in any desirable form, i.e., either as such or as a suitable compound thereof. Preferably, the selenium is added in elemental form and the sulfur as a sulfide such as zinc sulfide, barium sulfide, alkali metal sulfide, and the like. The amount of sulfur or sulfur and selenium added to the glaze base composition will, of course, depend on the color and depth of color desired. Generally, when calculated as the free element, from about 0.2% to about 10% sulfur or from about 0.2% to 10% sulfur and from about 0.2% to 10% selenium, based on the weight of the glaze base, will be sufficient to provide highly colored glazes. Amounts in the range of about 0.5% to 3% sulfur and from about 0.5% to 3% each of sulfur and selenium are particularly preferred.

The glaze base composition containing sulfur or sulfur and selenium is, as stated, heated in a reducing atmosphere to form a frit or vitrified mass. The temperature of heating is important only to the extent that the composition should form a homogeneous melt. The heating, however, must be carried out in a reducing atmosphere, i.e., in the absence of oxygen, so that the sulfur or sulfur and selenium therein are present in reduced form.

The fritted or vitrified mass is next ground to a state of fine division and compounded with the cadmium component of the pigment. Any cadmium compound which will provide cadmium ions at the maturation temperature of the glaze can be used. Particularly useful are cadmium oxide, cadmium carbonate, cadmium hydroxide, and the like. The amount of cadmium compound used is not critical but, of course, must be sufficient to provide adequate pigment for the desired color. Some color is formed with as little as 0.2% CdO added to the final glaze. Practically, however, the amount of cadmium will range from about 0.5% to 5% (based on Cd) by weight of the glaze, and preferably from about 1 to 2.5%. The cadmium compound as such can be compounded with the above frit to produce the glazing composition or alternatively can be added to a glazing base composition, heated under nonreducing and preferably strong oxidizing conditions to form a cadmium-containing frit, ground and then compounded with the above frit to produce the glazing composition. Glazing base compositions suitable for formation of the cadmium-containing frit include any of the compositions indicated above for use in preparing the sulfur or sulfur and selenium-containing frit, but, ideally, will not, of course, contain more than trace amounts of sulfur or selenium since under the prevailing conditions the sulfur and selenium will be lost due to their high vapor pressure or the high vapor pressure of their oxidation products. This presence of sulfur or selenium, however, is not detrimental, but, because of the high loss, is not economical and is difficult to control.

The glazing composition prepared by compounding the sulfur or sulfur and selenium-containing frit with the cadmium compound or cadmium-containing frit is now ready for application to the ceramic bodies which are to be provided with glazed surfaces. The glazing composition can be applied to the ceramic body in finely divided dry form or as a suspension or slurry in an inert liquid medium, preferably containing a suspension or flotation aid. The glazing composition can be applied to bisque bodies, that is, ceramic bodies which have previously been burned to maturity, or to unburned bodies, that is, green ware. The ceramic body bearing the glazing composition is next subjected to heat for the purpose of maturing the glaze, i.e., reducing the glazing composition to a liquid or semi-liquid, vitrified or glassy condition, and then, after maturation is complete, cooled. During the heating of the glaze, the cadmium and sulfur or sulfur and selenium ions become mobile and form cadmium sulfide or cadmium sulfoselenide pigment which precipitates in the glaze. Because the pigment cannot form until the glazing composition is being matured, higher temperature glazes and/or longer firing times can be employed without detriment to color. In fact, glazing compositions having a wide range of maturation temperatures and times, as for example, 1150° F. for 15 minutes, 1925° F. for 18 hours, 2100° F. for 1 hour, and the like, have been successfully employed using the process of this invention.

The invention is illustrated by reference to the following examples in which all parts and percentages are by weight unless otherwise indicated. The frits designated as A, B, C and D and used in these examples were prepared by heating the formulations described in Table I below at 2300 to 2400° F. for 1 hour, a reducing atmosphere being used for frits B and C, and an oxidizing atmosphere for frits A and D.

TABLE I

|  | Frit formulation | | | |
|---|---|---|---|---|
|  | A | B | C | D |
| PbO | 42.10 |  |  |  |
| Silica | 33.50 | 22.30 | 21.98 | 21.98 |
| Feldspar |  | 40.30 | 39.90 | 39.90 |
| Na₂CO₃ |  | 3.40 | 3.40 | 3.40 |
| CaCO₃ |  | 10.20 | 10.10 | 10.10 |
| Boric acid |  | 12.90 | 12.70 | 12.70 |
| ZnO |  | 7.50 | 7.40 | 7.40 |
| ZnS |  | 3.40 | 3.40 |  |
| Se |  |  | 1.12 |  |
| CdO | 24.40 |  |  | 4.52 |

EXAMPLE 1

A glazing composition was prepared by grinding together for 1 hour in a pebble mill 14.4 parts of frit A, 84.6 parts of frit B and 1.0 part of clay (suspending agent). The glaze was sprayed onto a bisque tile (1" x 12") and the tile was fired in a gas fired kiln at 1800° F. for 1 hour, after which time it was cooled to room temperature. A brilliant yellow glaze resulted.

EXAMPLE 2

The procedure of Example 1 was repeated except that 84.6 parts of frit C was substituted for frit B. A bright red glaze resulted.

EXAMPLE 3

Following the general procedure of Example 1, a glaze containing 50.0 parts of frit C and 50.0 parts of frit D was applied to a bisque tile and fired at 1800° F. for 1 hour. The glaze was practically identical with the glaze produced in Example 2.

EXAMPLE 4

Example 1 was repeated except that 9.3 parts of lead bisilicate, 1.6 parts of silica, and 3.5 parts of cadmium oxide were substituted for the 14.4 parts of frit A. The glaze was a brilliant yellow.

EXAMPLE 5

Example 4 was repeated except that 84.6 parts of frit C was substituted for frit B. The glazed tile was a bright red, and identical to that obtained in Example 2. For the sake of comparison, a second tile was coated and fired in the same manner except that the glazing composition was prepared by grinding 1.1 parts of clay and 3.2 parts of bright red cadmium sulfoselenide pigment with 95.7 parts of a frit produced by smelting under oxidizing conditions all of the ingredients of frit formulation C except for the cadmium oxide, zinc sulfide and selenium. The resulting glaze was a very dark color having a maroon cast.

EXAMPLE 6

The procedure of Example 3 was repeated except that 96.2 parts of frit C was used and 3.8 parts of cadmium oxide was substituted for frit D. The resulting glazed article was identical to that of Example 3.

What I claim and desire to protect by Letters Patent is:
1. A process for producing glazing compositions, which on firing to maturation temperatures on ceramic bodies provide brilliant yellow to bright red glazes containing finely dispersed cadmium sulfide yellow or cadmium sulfoselenide red pigment, comprising the steps of
   (a) adding to a glazing base the sulfur or sulfur and selenium components of the pigment;
   (b) heating the base in a reducing atmosphere to form a frit containing reduced sulfur or sulfur and selenium; and then
   (c) compounding the frit with a cadmium compound which produces cadmium ions at the maturation temperature.

2. The process of claim 1 wherein the cadmium compound is added to a glazing base and heated in an oxidizing atmosphere prior to compounding with the frit.

3. The process of claim 1 wherein the sulfur component is zinc sulfide.

4. The process of claim 1 wherein the cadmium compound is cadmium oxide.

5. A glazing composition comprising an intimate mixture of (a) a frit containing reduced sulfur or sulfur and selenium, and (b) a cadmium compound capable of providing cadmium ions at maturation temperature, said composition, when applied to a ceramic body and fired at maturation temperature, providing a brilliant yellow to bright red glaze containing cadmium sulfide yellow or cadmium sulfoselenide red pigment finely dispersed therein by reaction of said reduced sulfur or sulfur and selenium and said cadmium compound.

6. The composition of claim 5 wherein the cadmium compound is cadmium oxide.

7. A process for producing ceramic bodies provided with brilliant yellow to bright red glazes comprising the steps of (a) applying to a ceramic body a glazing composition comprising an intimate mixture of a frit containing reduced sulfur or sulfur and selenium and a cadmium compound capable of providing cadmium ions at maturation temperature to react with said reduced sulfur or sulfur and selenium;

(b) firing the ceramic body and glazing composition carried thereby at maturation temperature whereby cadmium sulfide yellow or cadmium sulfoselenide pigment forms as a finely divided dispersion of pigment in the glaze; and then (c) cooling the glazed body.

8. The process of claim 7 wherein the cadmium compound is cadmium oxide.

References Cited

UNITED STATES PATENTS 2,020,559   11/1935   Malinovszky et al. __ 106—48 X

FOREIGN PATENTS 1,321,334   5/1962   France.

TOBIAS E. LEVOW, Primary Examiner

M. L. BELL, Assistant Examiner

U.S. Cl. X.R.

106—301